US009020532B2

(12) United States Patent
Teplitsky

(10) Patent No.: US 9,020,532 B2
(45) Date of Patent: Apr. 28, 2015

(54) APPARATUS AND METHODS FOR EXCHANGING LOCATION-BASED INFORMATION

(75) Inventor: Simon Teplitsky, La Mesa, CA (US)

(73) Assignee: QUALCOMM Incorporated, San Diego, CA (US)

( * ) Notice: Subject to any disclaimer, the term of this patent is extended or adjusted under 35 U.S.C. 154(b) by 848 days.

(21) Appl. No.: 11/353,513

(22) Filed: Feb. 13, 2006

(65) Prior Publication Data

US 2007/0191026 A1 Aug. 16, 2007

(51) Int. Cl.
*H04W 64/00* (2009.01)
*G01C 21/20* (2006.01)
*H04W 4/02* (2009.01)
*G01S 5/00* (2006.01)
*G01S 19/48* (2010.01)

(52) U.S. Cl.
CPC .............. *G01C 21/20* (2013.01); *G01S 5/0027* (2013.01); *G01S 19/48* (2013.01); *H04W 4/02* (2013.01); *H04W 64/00* (2013.01)

(58) Field of Classification Search
USPC ............. 455/456.3, 414.1, 414.2, 457, 456.1; 715/738, 739; 705/26
See application file for complete search history.

(56) References Cited

U.S. PATENT DOCUMENTS

| | | | | | |
|---|---|---|---|---|---|
| 5,543,789 | A | * | 8/1996 | Behr et al. | 340/995.12 |
| 5,640,002 | A | * | 6/1997 | Ruppert et al. | 235/462.46 |
| 5,729,697 | A | * | 3/1998 | Schkolnick et al. | 705/23 |
| 6,334,090 | B1 | * | 12/2001 | Fujii | 701/213 |
| 6,434,530 | B1 | * | 8/2002 | Sloane et al. | 705/1 |
| 6,442,530 | B1 | * | 8/2002 | Miller | 705/16 |
| 6,912,507 | B1 | * | 6/2005 | Phillips et al. | 705/26 |
| 2002/0065714 | A1 | * | 5/2002 | Goodwin, III | 705/14 |
| 2002/0102993 | A1 | * | 8/2002 | Hendrey et al. | 455/456 |
| 2002/0178013 | A1 | * | 11/2002 | Hoffman et al. | 705/1 |
| 2003/0134648 | A1 | * | 7/2003 | Reed et al. | 455/456 |
| 2003/0144793 | A1 | * | 7/2003 | Melaku et al. | 701/209 |
| 2004/0104930 | A1 | * | 6/2004 | Stoler | 345/738 |
| 2004/0155816 | A1 | * | 8/2004 | Soliman | 342/357.09 |
| 2004/0217166 | A1 | * | 11/2004 | Myers et al. | 235/383 |
| 2006/0059049 | A1 | * | 3/2006 | Morris et al. | 705/26 |

* cited by examiner

*Primary Examiner* — Ariel Balaoing
(74) *Attorney, Agent, or Firm* — Fariba Yadegar-Bandari

(57) ABSTRACT

The disclosed embodiments provide apparatus and methods for exchanging location-based information between a wireless communications device and a computer system. In one embodiment, the location-based information may include a layout of a physical location corresponding to a geographic position associated with the wireless communications device. In another embodiment, the location-based information may include directions from the geographic position, through the layout, to an item location associated with an item in the physical location. Additional disclosed embodiments relate to the wireless communications device, presentation of the location-based information on the wireless communications device, and associated computer-readable media.

34 Claims, 6 Drawing Sheets

APPARATUS AND METHODS FOR EXCHANGING LOCATION-BASED INFORMATION

BACKGROUND

The disclosed embodiments relate to wireless communications systems, and more particularly, to systems and methods for providing physical location and/or item location information to a wireless communications device.

Wireless communications devices, such as mobile phones, pagers, handheld computers, etc., are becoming increasingly popular for both business and personal use. One advantage of such devices is their "wireless" aspect, allowing them to be utilized whenever and wherever a user desires. As such, a user may carry a wireless communications device with them as they travel. Some wireless devices, such as GPS-type devices or communications devices wirelessly connected to a map server on the Internet, provide maps and travel directions to the user. These maps and travel directions, however, are typically limited to roads and directions through the roads or geographic locations, and to physical locations, such as hotels, restaurants, stores, etc., on the roads. Upon arriving at a physical location, however, users who are unfamiliar with the physical location typically must consult hard copy building/store maps, information booths, or personnel within the physical location to find their way around. A further complication is that such hard copy building/store maps, information booths and personnel often do not disclose or know the location of particular items within the physical location.

Thus, systems and methods for providing details of a physical location and an item location to a wireless communications device are desired.

BRIEF SUMMARY

The disclosed embodiments provide apparatus and methods for communicating map information, including at least one of a layout of a physical location and an identification of an item location, between a mapping module of a computer system and a wireless communications device. Such a communication may be based on the geographic position of the wireless communications device.

In one embodiment, for example, a location-based method of communicating information comprises receiving a geographic position associated with a wireless communications device, and generating map information for receipt by the wireless communications device, the map information including physical location information including a layout of a physical location corresponding to the geographic position. In an alternate embodiment, a computer-readable medium for communicating location-based information comprises at least one sequence of instructions, wherein execution of the instructions by a processor causes the processor to perform the above-defined steps.

In another embodiment, a method of communicating a location of an item comprises receiving a geographic position of a wireless communications device, receiving an item identification of the item, generating map information including a layout of a physical location corresponding to the geographic position of the wireless communications device and directions from the geographic position to an item location within the physical location, and transmitting the map information to the wireless communications device. In an alternate embodiment, a computer-readable medium for communicating location-based information comprises at least one sequence of instructions, wherein execution of the instructions by a processor causes the processor to perform the above-defined steps.

In a further embodiment, an apparatus for wirelessly communicating location-based information comprises a map generator for generating map information for receipt by the wireless communications device and including physical location information having a layout of a physical location corresponding to a geographic position associated with a wireless communications device.

In still another embodiment, an apparatus for communicating a location of an item comprises a map generator operable to receive a geographic position associated with a wireless communications device, wherein the map generator is further operable to generate map information including a layout of a physical location corresponding to the geographic position of the wireless communications device. The apparatus also includes a route generator operable to receive an item identification of the item, wherein the route generator is further operable to generate directions from the geographic position to an item location within the physical location, wherein the item location corresponds to the item. Further, the map generator is operable to incorporate the directions and the item location into the map information and transmit the map information for receipt by the wireless communications device.

In still another embodiment, a wireless communications device comprises a processor, a display coupled to the processor and operable to display a user interface responsive to the processor, and a memory coupled to the processor and having instructions which, when executed by the processor, cause the processor to present the user interface on the display, wherein the user interface includes a layout of a physical location corresponding to a geographic position associated with the wireless communications device.

In another embodiment, a method of presenting location based information on a wireless communications device comprises transmitting a geographic position associated with the wireless communications device, receiving map information including a layout of a physical location corresponding to the geographic position, and presenting a user interface on a display of the wireless communications device, where the user interface includes map information. In an alternate embodiment, a computer-readable medium for presenting location-based information comprises at least one sequence of instructions, wherein execution of the instructions by a processor causes the processor to perform the above-defined steps.

In yet another embodiment, a method of assisting a user in shopping comprises receiving a geographic position associated with a wireless communications device associated with the user, receiving a plurality of item identifications associated with items of interest to the user, and generating map information for receipt by and presentation on the wireless communications device. The map information has physical location information including a layout of a physical location corresponding to the geographic position and a plurality of item locations corresponding to the plurality of item identifications, where each of the plurality of item locations comprises a position of the respective item within the layout.

Additional advantages of the disclosed embodiments are set forth in part in the description which follows, and in part are obvious from the description, or may be learned by practice of the disclosed embodiments. The advantages of the disclosed embodiments may also be realized and attained by the means of the instrumentalities and combinations particularly pointed out in the appended claims.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which.

DETAILED DESCRIPTION

The described embodiments provide a wireless communications device and a location apparatus that enable a user of the device, among other things, to obtain physical location information, and obtain item information and locate items within the physical location. For example, a user may rely on these apparatus and methods to find a store in an unfamiliar mall, or to find one or more items on their "shopping list" from within a store. Additionally, a user may turn to such apparatus and methods for guidance through a museum, or through a maze of exhibitors at an exhibition. It should be understood that these examples are not to be construed as limiting, and the many other details and features of the devices and methods associated with the location apparatus are described below.

Figure 1:
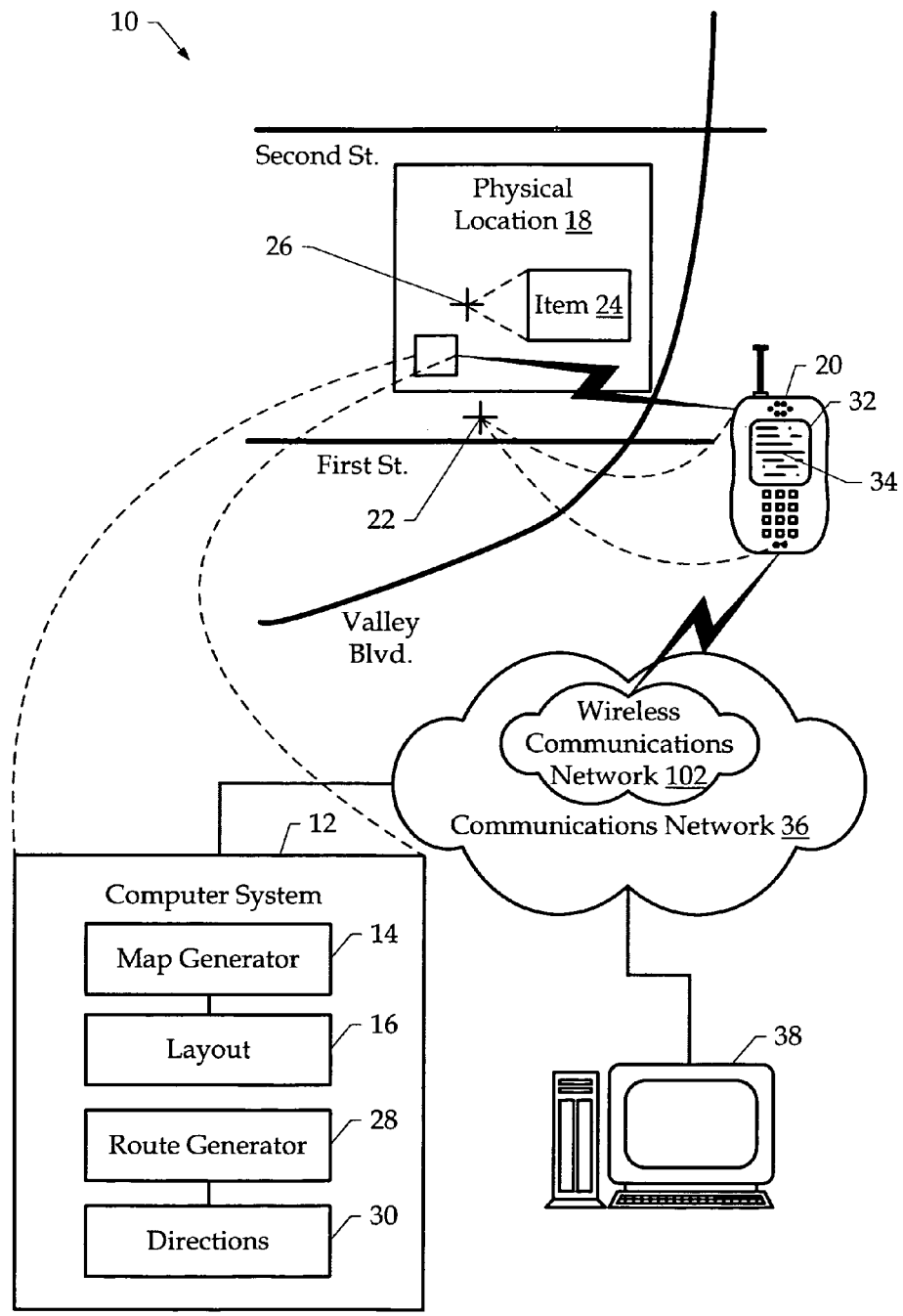
FIG. 1 is schematic diagram of one embodiment of a system for providing map information, including at least one of a layout of a physical location and directions to an item location within the physical location, from a computer system to a wireless communications device.
Figure 2:
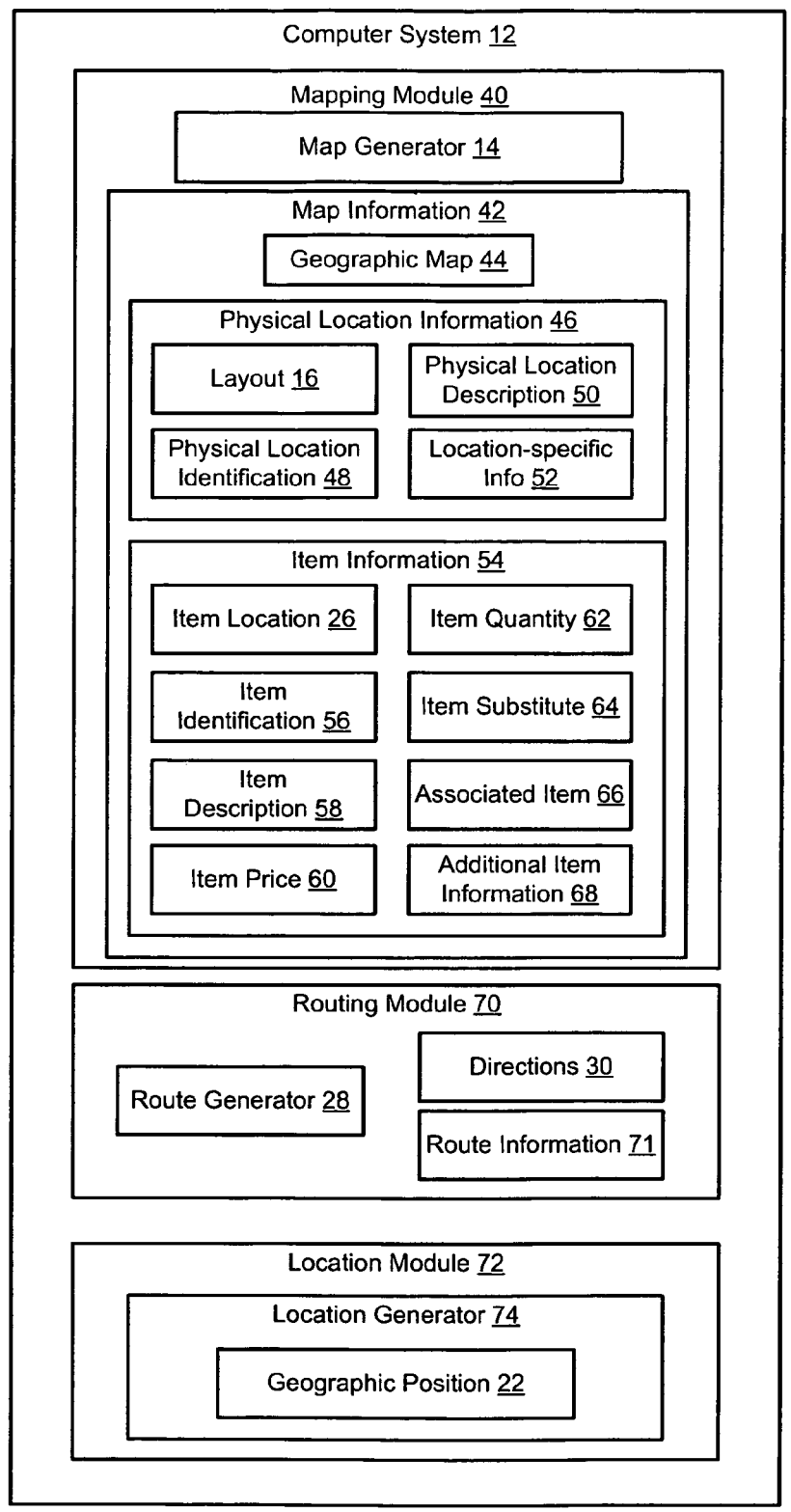
FIG. 2 is a schematic diagram of one embodiment of various modules and data associated with the computer system of FIG. 1.
Figure 3:
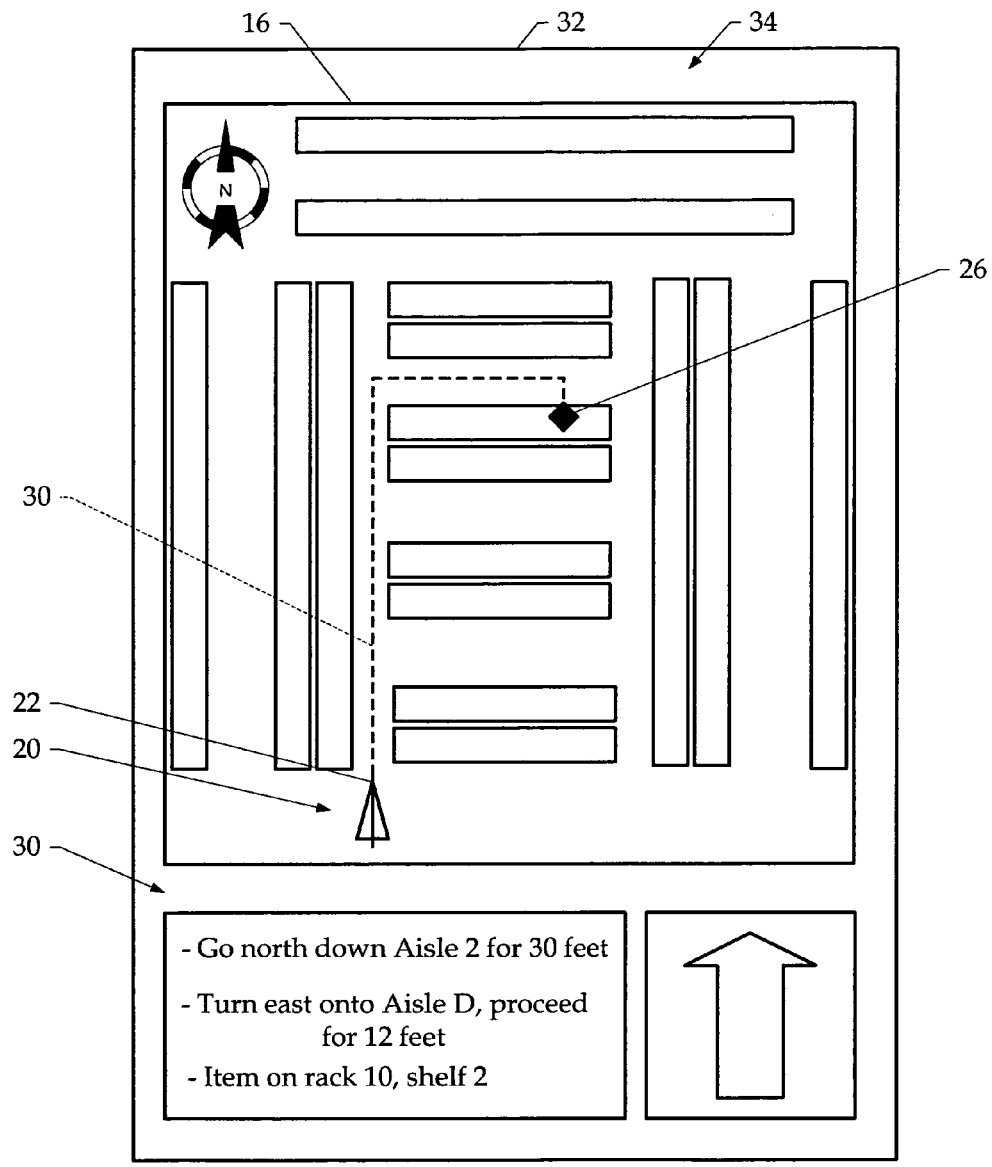
FIG. 3 is schematic diagram of one embodiment of a user interface of a display of the wireless communication device of FIG. 1.

Referring to FIGS. 1-3, one embodiment of a locating system 10 includes a computer system 12 having a map generator 14 for transmitting map information, such as a layout 16 of a physical location 18, to a wireless communications device ("WCD") 20, for example, based on a geographic position 22 of the WCD. Additionally, for example, in order to aid a user of WCD 20 in finding one or more items 24 located within physical location 18, map generator 14 may further generate and transmit item information, such as an item location 26 associated with and/or superimposed on layout 16. Further, computer system 12 may include a route generator 28 for transmitting route information, such as directions 30 from geographic position 22 to one or more item locations 26 to WCD 20. WCD 20 may include an output mechanism 32, such as a display, for presenting to the user a user interface 34 that includes a representation of layout 16 of physical location 18, as well as one or more item locations 26 and/or directions 30. For example, system 10 provides a user of WCD 20 the ability to find a store in a mall, and/or find merchandise in a store, based on their geographic position by downloading the associated layout and item location information from computer system 12. Thus, system 10 enables a user of WCD 20 to quickly and easily navigate through an unfamiliar building and/or find one or more desired items within the building.

Additionally, system 10 includes a communications network 36 that provides a wireless communications portal enabling WCD 20 to communicate with other wireless devices and computer systems across the communications network. Similarly, communications network 36 may additionally provide communications access to computer system 12, such as may be desired by other computer systems associated with communications network 36. For instance, in one embodiment, remote computer system 38, such as a remotely-located desktop computer, may be utilized by a user to communicate with computer system 12 and/or WCD 20. For example, a user may input a list of items into remote computer system 38, which may then be downloaded to WCD 20 through communications network 36. Additionally, remote computer system 38 may be utilized to communicate with computer system 12 to identify a desired physical location and/or item(s), and to initiate downloading of the associated mapping, routing and item information from computer system 12 to WCD 20 via communications network 36.

In one embodiment, computer system 12 may include at least one of a server, a personal computer, a mini-mainframe, a workstation, any other type of computing device, and any combination thereof, operable to execute the instructions and perform the functions associated with system 10. Computer system 12 may be located at one or more places within physical location 18, such as in interconnected but dispersed modules in close proximity to geographic position 22 of WCD 20 to thereby enable short range communications and WCD position determination. Alternately, computer system 12 may be located remotely from physical location 18 and may communicate with WCD 20 through communications network 36. In another alternative, computer system 12 may include some modules dispersed locally within physical location 18, and at least one module located remotely from, but in communication with, the other modules such as across communications network 36.

Referring specifically to FIG. 2, one embodiment of computer system 12 includes a variety of modules and associated information associated with map generation, position determination, route determination, and other information exchange capabilities of system 10. Each of the modules discussed below includes any combination of mechanisms, media and executable instructions resulting in a system operable to process and/or store the associated information relating to system 10, as is discussed below. For example, computer system 12 may include a mapping module 40 having map information 42 for generating information such as layout 16 of physical location 18 and directions 30 to item location 26 associated with geographic position 22 of WCD 20. Map information 42 may include a geographic map 44 and all or some portion of physical location information 46 referenced to the geographic map. Physical location information 46 may include audio, textual and/or graphical details relating to at least one physical location 18, which may include any physical structure having a physical feature and including at least one associated item location 26, or geographic position within physical location 18, where an item 24 may be found. For example, physical location 18 may include at least one of: a set of buildings or structures; a building or some portion of the building, e.g. a floor, section or department; a wall; an aisle; a shelf; a bin; a stand; a rack; a drawer; a booth; and any combination thereof. In particular, physical location information 46 may include a physical location identification 48, such as a name, number, character, graphic, audio signature, an audio message and/or narration, any combination thereof, and any other user or computer recognizable identifier associated with a given physical location 18. Additionally, physical location information 46 may include a physical location description 50, such as words, graphics, audio information, any combination thereof, and any other type of information utilizable to convey to a user relevant details relating to a given physical location. Further, physical location information 46 also includes at least one layout 16 corresponding to the given physical location. Layout 16 includes a representation of the physical relationship, such as the relative positioning, between the various physical features associated with a given physical location. Still further, physical location information 46 may include location-specific information 52, such as any other information related to a given physical location. For example, location-specific information 52 may include a special audio and/or text message, a list of sales and/or sale items, directions, instructions, and rebates associated with a given physical location.

Additionally, map information 46 may further include all or some portion of item information 54, which includes audio, textual and/or graphical details relating to at least one item 24, such as a product and/or information available at a certain position within a given physical location 18. Further, the representation of item information 54 may change after the user of WCD 20 visits the associated item location 26, thereby enabling the user to keep track of where they have been and where they need to go in cases where the user is interested in multiple items within a single physical location. Suitable examples of item 24 include: a product or piece of merchandise, such as a piece of hardware in hardware store, a particular foodstuff in a grocery store, a toy in a toy store, etc.; a display, such as a piece in a museum, a presentation board or advertisement at a conference, etc.; a physical feature, such as natural formation or man-made structure in a park, a building in a set of buildings, a store in a mall, a section of a store, etc.; a lecture hall on a college campus; a conference room in a building; and any combination thereof. In particular, item information 54 includes item location 26, as discussed above. Further, item information 54 may include an item identification 56, such as a name, number, character, graphic, audio signature, stockkeeping unit ("SKU") number, barcode, model number, universal product code ("UPC"), any combination thereof, and any other user or computer recognizable identifier associated with a given item. Additionally, item information 54 may include an item description 58, such as words, graphics, audio information, a narration, any combination thereof, and any other type of information utilizable to convey to a user relevant details relating to a given item. Further, item information 54 may include an item price 60, such as a cost associated with a given item, as well as an item quantity 62, such as a number of items on hand at a given physical location. Item price 60 and item quantity 62 may be correlated with a given physical location, and as such a given item may have more than one item price 60 and more than one item quantity 62 depending on the corresponding physical location 18. Also, item information 54 may further include an item substitute 64, such as an identification of an equivalent or alternative item that may be utilized in the place of a given item. Item information 54 may also include at least one associated item 66, such as an identification of an item that is commonly used with a given item. For example, if the given item is a can of paint, then associated item 66 may include paint brushes, rollers, painting tape, paint thinner, drop cloth, etc. Further, item information 54 may include additional item information 68 in an audio and/or text format, such as assembly and/or use instructions, warnings, warranty information, any combination thereof, and any other relevant information that may be associated with a given item.

Additionally, computer system 12 may include a routing module 70 that operates to determine route information 71 associated with locating items 24 within physical location 18. Routing module 70 includes the above-discussed route generator 28, and routing information 71 includes directions 30 from geographic position 22 of WCD 20 to item location 26. Directions 30 relate to a path through the physical features of physical location 18. Directions 30 may include a list of movements and directions, such as alphanumeric instructions, as well as a graphical representation of such movements, such as representations of the path, the direction to move, etc. Additionally, directions 30 may include audio instructions, such as a voice telling a user which way to go. Routing module 70 may further include applications, algorithms, etc. for determining and/or optimizing additional routing information, such as a travel time and/or travel distance associated with directions 30. For instance, routing module 70 may determine the shortest distance, the shortest time, etc. associated with moving from geographic position 22 to one or more item locations.

Further, computer system 12 may include a location module 72 operable to determine geographic position 22 of WCD 20. Alternatively, geographic position 22 may be received by computer system 12 from an outside entity. Location module 72 may have a location generator 74 operable to generate geographic position 22 based on communications with WCD 20 and/or other geographic/location determination systems. For example, location module 72 and/or location generator 74 may include a geographic information system ("GIS"), such as a tool used to gather, transform, manipulate, analyze, and produce information related to the surface of the earth. Such a GIS can be as complex as a whole system using dedicated databases and workstations hooked up to a network, or as simple as "off-the-shelf" desktop software. One example of such a system may include the QPoint™ Positioning Software and gpsOne® hybrid Assisted GPS wireless location technology, available from Qualcomm, Inc. of San Diego, Calif.

In one embodiment, such a GIS may include a global positioning system ("GPS"), such as a satellite navigational system formed by satellites orbiting the earth and their corresponding receivers on the earth. The GPS satellites continuously transmit digital radio signals that contain data on the satellites' location and the exact time to the earth-bound receiver. The satellites are equipped with atomic clocks that are precise, for example, to within a billionth of a second. Based on this information the receivers know how long it takes for the signal to reach the receiver on earth. As each signal travels at the speed of light, the longer it takes the receiver to get the signal, the farther away the satellite is located. By knowing how far away a satellite is, the receiver knows that it is located somewhere on the surface of an imaginary sphere centered at the satellite. By using three satellites, GPS can calculate the longitude and latitude of the receiver based on where the three spheres intersect. By using four satellites, GPS can also determine altitude. In one embodiment, the GPS "receiver" may be a portion of WCD 20.

In another embodiment, such a GIS may include a network-based positioning system whereby location module 72 determines geographic position 22 based on network communications WCD 20. For instance, communication signals may be exchanged between location module 72 and WCD 20 that include timing information that enables location module 72 to compute a relative position, and hence geographic position 22, of the WCD with respect to a known position. For example, such communications signals may include the signals periodically exchanged between a cellular telephone and a base station. Such a network-based system may also be utilized in combination with a GPS-based system.

Figure 4:
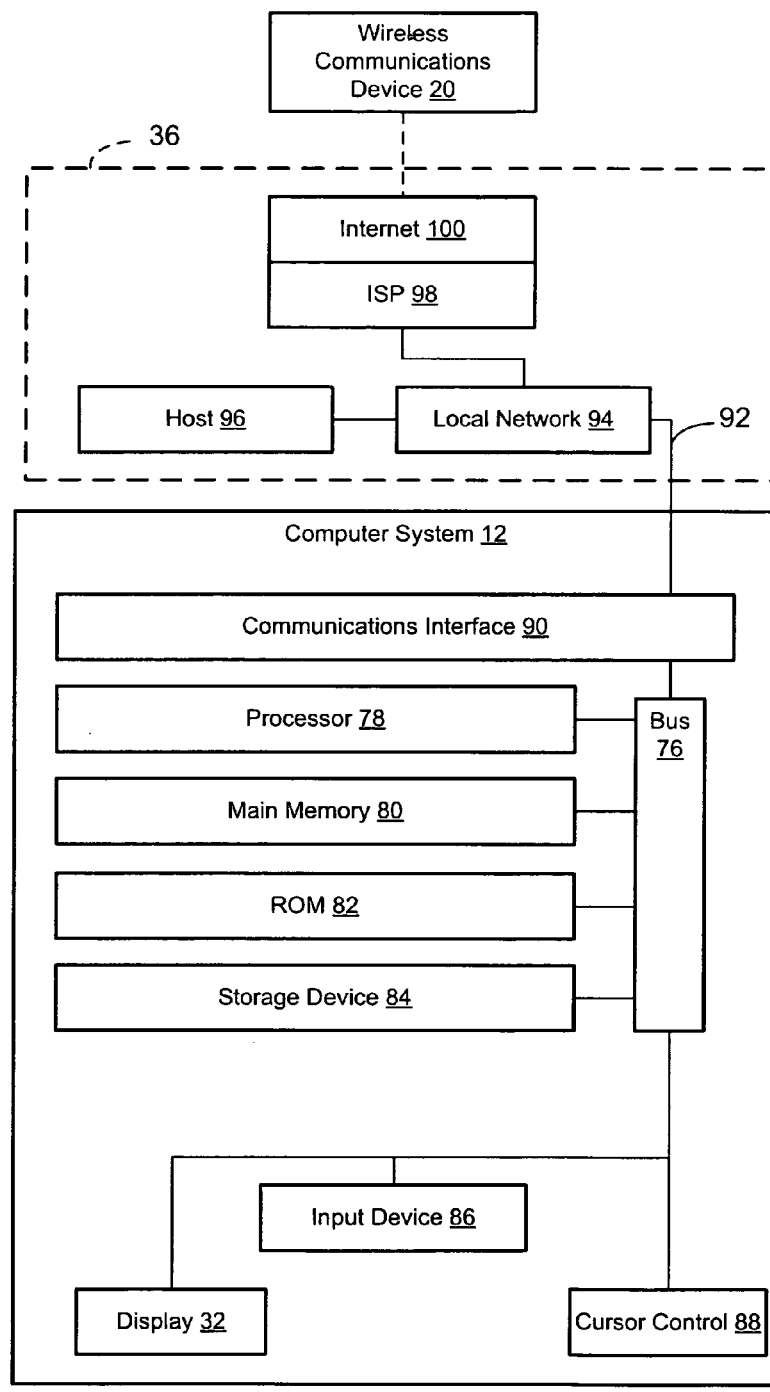
FIG. 4 is a schematic diagram of an embodiment of the computer system of FIG. 1 and its connections with wireless communications device.

Further, referring to FIG. 4, one embodiment of computer system 12 includes a bus 76 or other communication mechanism for communicating information, and a processor 78 coupled with the bus 76 for processing information. Computer system 12 also includes a main memory 80, such as a random access memory (RAM) or other dynamic storage device, coupled to the bus 76 for storing data and instructions, such as data and instructions related to mapping module 40, routing module 70 and/or location module 72, to be executed by processor 78. Main memory 80 also may be used for storing temporary variables or other intermediate information during execution of instructions to be executed by processor 78. Computer system 12 may further include a read only memory (ROM) 82 or other static storage device coupled to the bus 76 for storing static information and instructions for the processor 78. A storage device 84, such as a magnetic disk or optical disk, is provided and coupled to the bus 76 for additional storage of data and instructions related to system 10.

Computer system 12 may be coupled via the bus 76 to output mechanism 32, such as a cathode ray tube (CRT) or a flat panel display, for displaying information to a user. An input device 86, including alphanumeric and function keys, is coupled to the bus 76 for communicating information and command selections to the processor 78. Another type of user input device may be a cursor control 88, such as a mouse, a trackball, or cursor direction keys for communicating direction information and command selections to processor 78 and for controlling cursor movement on the display. This input device typically has two degrees of freedom in two axes, a first axis (e.g., x) and a second axis (e.g., y) allowing the device to specify positions in a plane.

The described embodiments relate to the use of computer system 12, such as the embodiment of FIGS. 2 and 4, to manage communications with at least one of a WCD 20 and remotely-located computer system 38 to carry out the instructions of at least one of mapping module 40, routing module 70 and/or location module 72. According to one embodiment, for example, data relating to geographic position 22 of WCD 20 and item location 26 are tracked and analyzed by computer system 12 in response to processor 78 executing sequences of instructions contained in main memory 80 in response to input received via input device 86, cursor control 88, and/or a communications interface 90. Further, such instructions may be read into main memory 80 from another computer-readable medium, such as storage device 84. However, the computer-readable medium is not limited to devices such as storage device 84. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 80 causes the processor 78 to perform the process steps described below. In alternative embodiments, hard-wired circuitry and/or firmware may be used in place of or in combination with computer software instructions to implement the described embodiments. Thus, the described embodiments are not limited to any specific combination of hardware circuitry and software.

Communications interface 90, which is coupled to bus 76, provides two-way data communication with another device and/or network. For example, two or more computer systems 12 may be networked together in a conventional manner with each using the communications interface 90. Suitable examples of communications interface 90 may be an integrated services digital network (ISDN) card, a digital subscriber line (DSL) card, or a modem to provide a data communication connection to a corresponding type of telephone line. As another example, communications interface 90 may be a local area network (LAN) card to provide a data communication connection to a compatible LAN. Wireless links may also be implemented. In any such implementation, communications interface 90 is operable to send and receive electrical, electromagnetic and/or optical signals which carry digital data streams representing various types of information. Of particular note, the communications through interface 90 may permit transmission or receipt of data such as map information 42, physical location information 46, item information 54 and any other data and/or instructions associated with computer device 12 and/or system 10.

Network link 92 typically provides data communication through one or more networks to other data devices. In one embodiment, for example, network link 92 may provide a connection through local network 94 to a host computer 96 or to data equipment operated by an Internet Service Provider (ISP) 98. ISP 98 in turn provides data communication services through the world wide packet data communication network now commonly referred to as the "Internet" 100. Local network 94 and Internet 100 both use electrical, electromagnetic and/or optical signals which carry digital data streams. The signals through the various networks and the signals on network link 92 and through communications interface 90, which carry the digital data to and from computer system 12, are exemplary forms of carrier waves transporting the information. It should be noted that communications network 36 may include any combination of network link 92, local network 94, host computer 96, ISP 98 and Internet 100.

Computer system 12 can send messages, including program code and map information 42, and receive data through the network(s), network link 92 and communications interface 90. In the Internet example, computer system 12 might transmit a requested code for an application program or map information 42, such as to WCD 20, through Internet 100, ISP 98, local network 94 and communications interface 90. In accordance with the described embodiments, such a downloaded application and/or information may be operated by WCD 20 which provides for the local management of the data and instructions associated with system 10.

Referring back to FIG. 1, communications network 36 may be a distributed computer network that includes at least a wireless communications network 102. Communications network 36 may include at least one of a local area network, a wide area network, a public switched telephone network ("PSTN"), a satellite telephone network, a terrestrial telephone network, and a heterogeneous public network of computers such as the Internet. Wireless communications network 102 may include at least one or a combination of networks for providing, at least in some portion, a wireless communications transmission between two devices. Suitable examples of wireless communications network 102 include at least one, or any combination, of: a cellular telephone network; a terrestrial telephone network; a satellite telephone network; an infrared network such as an Infrared Data Association (IrDA)-based network; a short range wireless network; a Bluetooth® technology network; a home radio frequency (HomeRF) network; a shared wireless access protocol (SWAP) network; a wideband network, such as a wireless Ethernet compatibility alliance (WECA) network, a wireless fidelity alliance (Wi-Fi Alliance) network, and a 802.11 network; a public switched telephone network; a public heterogeneous communications network, such as the Internet; a private communications network; and land mobile radio networks. Suitable examples of telephone networks include at least one, or any combination, of analog and digital networks/technologies, such as: Personal Communications Services, code division multiple access, wideband code division multiple access, universal mobile telecommunications system, advanced mobile phone service, time division multiple access, frequency division multiple access, global system for mobile communication, analog and digital satellite systems, and any other technologies/protocols that may be used in at least one of a wireless communications network and a data communications network.

WCD 20 may include any type of computerized device operable to transmit and receive communications signals across communications network 36. Suitable examples of such communications devices include a cellular telephone, a satellite telephone, a land-based telephone, a personal digital assistant, a two-way pager, a desktop or laptop computer or workstation, a server, etc. For example, WCD 20 may be in short range communication with at least some portion of computer system 12, such as through a Bluetooth® technology network. Alternatively, WCD 20 may be in communication with computer system 12 through a wireless terrestrial telephone network, such as a cellular or PCS network, connected to distributed computer network, such as the Internet. Also, WCD 20 may be in communication with computer system 12 through any other type of network link, such as an optical cable link or a radio link, connected to communications network 36.

Figure 5:
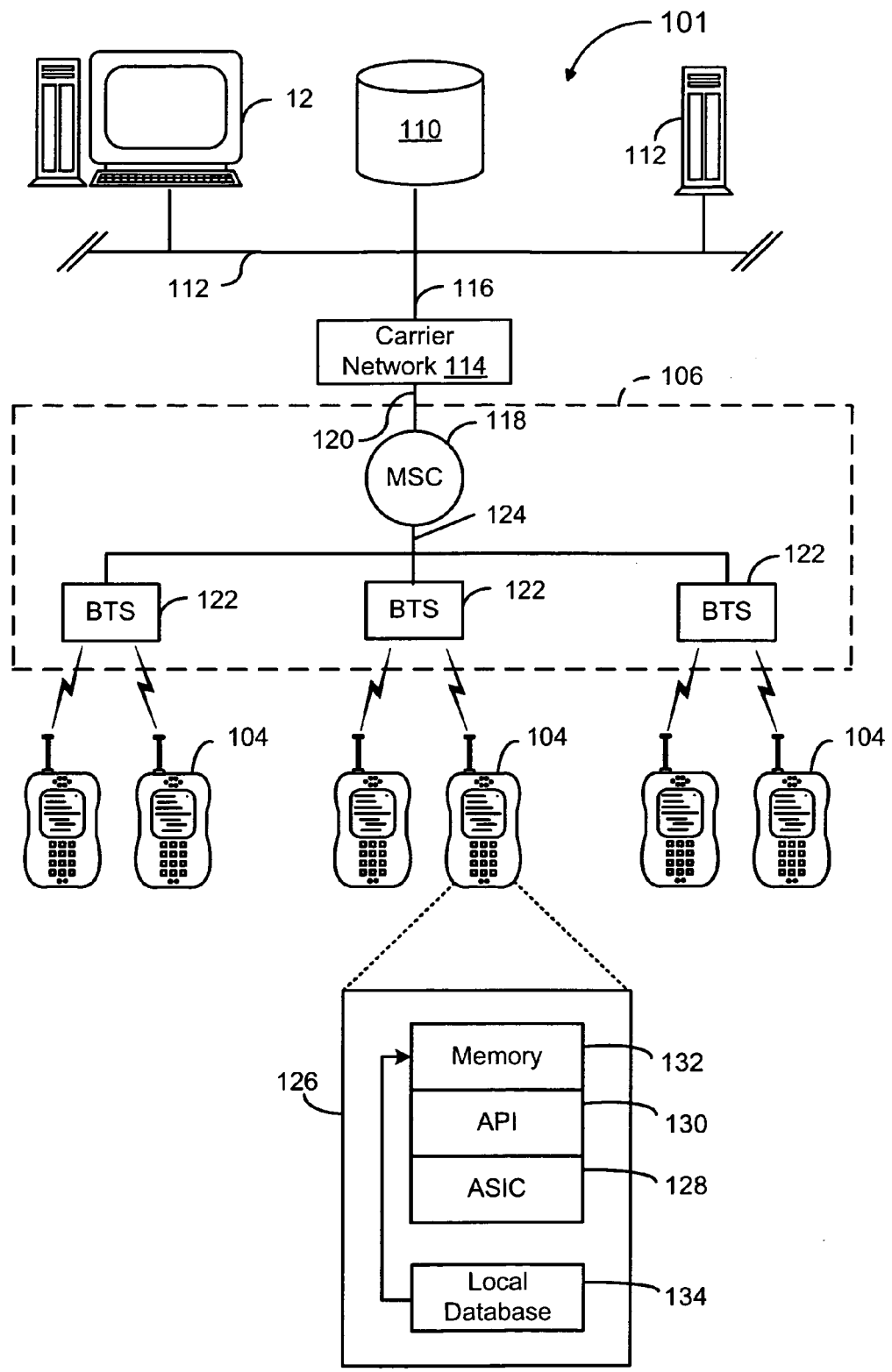
FIG. 5 is a schematic diagram of another embodiment of a portion of a system similar to the system of FIG. 1.

In another embodiment, referring to FIG. 5 for example, location-based system 10 may include wireless communications devices in the form of a cellular telephone 104 operable on wireless communications network 102, such as cellular telephone network 106. The use of cellular telecommunication pathways has been increasing because wireless mobile communications devices, such as cellular telephones, are being manufactured with increased computing capabilities and are becoming tantamount to personal computers, communicating packets including at least one of voice and data over the wireless network. Embodiments of these "smart" cellular telephones, for example, have installed application programming interfaces ("APIs") onto their resident computer platform that allow software developers to create software applications that operate on the cellular telephone, and control certain functionality on the device. FIG. 5 is a block diagram that more fully illustrates the components of a cellular wireless network and interrelation of the elements of the present system. Cellular telephone network 106 is merely exemplary and can include any system whereby remote modules, such as cellular telephones 104, communicate over-the-air between and among each other and/or between and among components of cellular telephone network 106, including, without limitation, wireless network carriers and/or servers. Although illustrated as cellular telephones 104, other wireless devices may be utilized such as a personal digital assistant, a two-way pager, and any other device having a computer platform that has a wireless communications portal.

Still referring to the embodiment of FIG. 5, computer system 12 and its associated modules may be present with any other related components on a network which is in communication with cellular telephone network 106. The related components may be other, dedicated system components that provide services and processes to the associated wireless devices. For example, computer system 12 may operate on LAN 108 with an additional data repository 110 and/or an additional data management or post-processing server 112, such as for storing and distributing data and applications, respectively. Computer system 12 communicates with a carrier network 114 through a data link 116, such as the Internet, a secure LAN, WAN, or other network. Carrier network 114 controls messages (generally being data packets) sent to a messaging service controller ("MSC") 118. Carrier network 114 communicates with the MSC 118 through another communications link 120, such as another network, the Internet, and/or POTS ("plain ordinary telephone system"). Typically, the network or Internet connection between carrier network 114 and MSC 118 transfers data, and the POTS transfers voice information. MSC 118 may be connected to multiple base stations ("BTS") 122, such as by at least one communications link 124, including both a data network and/or the Internet for data transfer and POTS for voice information. BTS 122 ultimately broadcasts messages wirelessly to the wireless communications devices, such as cellular telephones 104, in an over-the-air protocol such as short messaging service ("SMS"), etc.

In the embodiment of FIG. 5, each wireless device, such as cellular telephones 104, may include a computer platform 126 that can receive and execute software applications and display data transmitted from computer system 12 or other network servers 112. Computer platform 126 may include an application-specific integrated circuit ("ASIC") 128, or other chipset, processor, microprocessor, logic circuit, or other data processing device. ASIC 128 may be installed at the time of manufacture of cellular telephone 104. ASIC 128 or other processor may execute an application programming interface ("API") layer 130 that interfaces with any resident programs in a memory 132 of the wireless device. API 130 is a runtime environment executing on the computing device, or cellular telephone 104 in this case. One such runtime environment is Binary Runtime Environment for Wireless® (BREW®) software, although other runtime environments may be utilized that, for example, operate to control the execution of applications on wireless computing devices. Memory 132, for example, can be comprised of at least one of read-only and random-access memory (RAM and ROM), EPROM, EEPROM, flash cards, and any memory common to computer platforms. The computer platform 126 may also include a local database 134 that can hold the software applications, file, or data not actively used in memory 132, such as map information 42 downloaded from computer system 12 and item information 54 received from the user of cellular telephone 104. Local database 134 may include at least one of flash memory cells, magnetic media, EPROM, EEPROM, optical media, tape, a soft disk, a hard disk, and any other type of secondary or tertiary memory. Thus, in the embodiment of FIG. 5, each cellular telephone 104 may be loaded with applications 32 and/or data from computer system 12 in accordance with system 10.

The methods associated with the described embodiments are executable on the computer platforms of a wireless communications device such as cellular telephone 104, and on computer system 12, embodiments of the system can be implemented with at least one program resident in a computer readable medium, where the program directs a wireless communications device 20, such as cellular telephone 104, and/or computer system 16 to perform the steps of the method. Such a program can be executed on any single computer platform, or can be multithreaded among several computer platforms. Furthermore, embodiments include a program that directs a computer device such as computer system 12 to perform the steps of generating map information 42 through gathering and processing data, such as geographic position and item information, from the at least one WCD 20.

For example, the computer readable medium can be memory 132 of computer platform 126 of cellular telephone 104 and/or memory 80 associated with computer system 12. Such memory can be in a local database, such as local database 134 of the device platform 126 and/or in another database such as data repository 110. Further, the computer readable medium can be in a secondary storage media that is loadable onto a wireless device computer platform, such as a magnetic disk or tape, optical disk, hard disk, flash memory, or other type of storage media.

Further, the method embodiments may be implemented, for example, by operating one or more portions of system 10 to execute a sequence of machine-readable instructions. The instructions can reside in various types of signal-bearing or data storage primary, secondary, or tertiary media. The media may comprise, for example, RAM (not shown) accessible by, or residing within, the components of system 10. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

Figure 6:
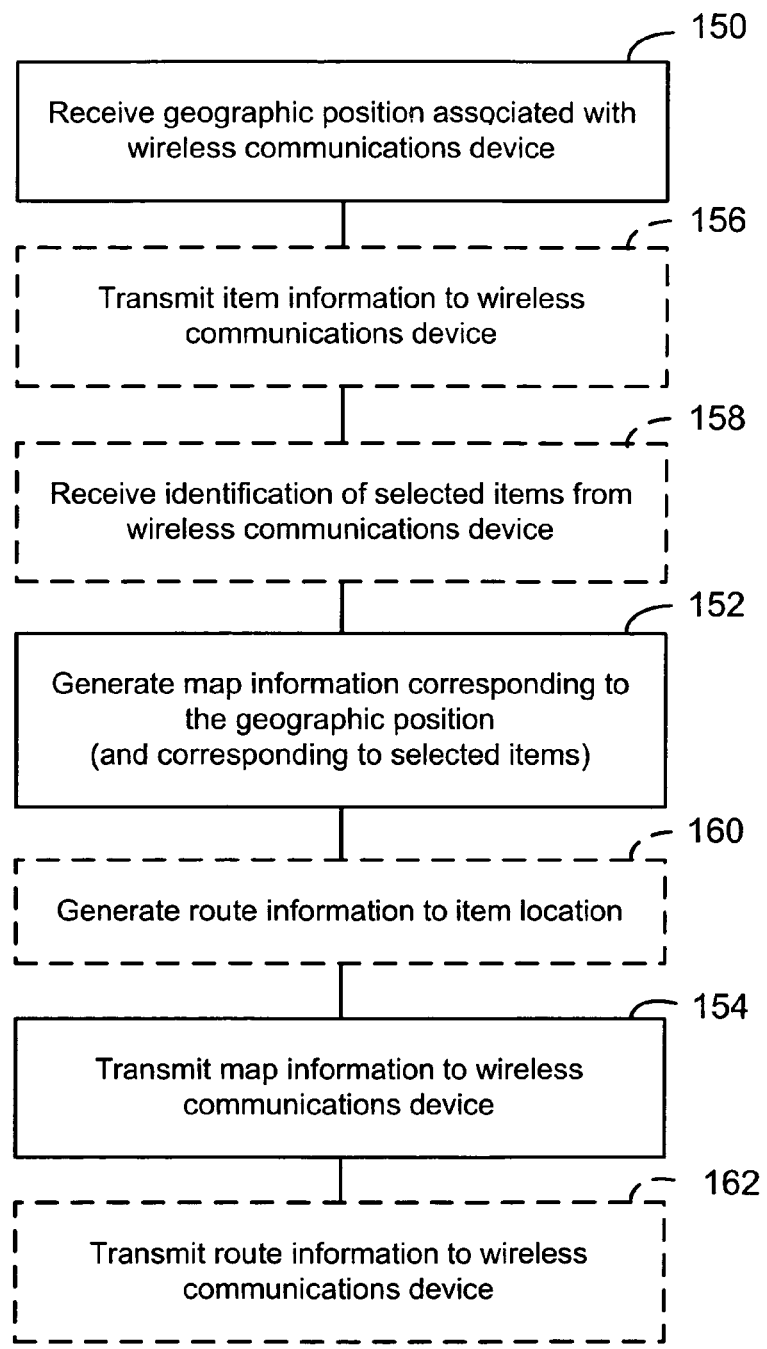
FIG. 6 is a flow diagram of an embodiment of a method of communicating map information associated with the system of FIG. 1.

In operation, system 10 may be utilized by a user of any wireless communications device to receive information relating to one or more physical locations within a geographic area where the device is positioned, as well as information relating to one or more items located within the respective physical locations. For example, referring to FIG. 6, one embodiment of a location-based method of communicating information includes receiving a geographic position associated with a wireless communications device (Block 150). For example, in one embodiment, WCD 20 may come within range of computer system 12 that communicates with WCD though a short-range, wireless communications protocol, such as Bluetooth technology. In this embodiment, because computer system 12 only broadcasts within a short distance, geographic position 22 of WCD 20 may be associated with the physical position of computer system 12. In alternate embodiments, location module 72 may communicate with WCD 20 and/or an outside entity that is also in communication with WCD, such as a geographic information system, to either calculate and/or receive a calculation of the current geographic position 22 of WCD 20, such as via a GPS system and/or a GIS system. The method further includes generating map information based on the received geographic position (Block 152). For example, in one embodiment, mapping module 40 receives geographic position 22 from location module 42 and identifies map information 42, including physical location information 46, corresponding to the received geographic position. Additionally, the method includes transmitting map information to the wireless communications device (Block 154). In one embodiment, for example, map generator 14 operates to initiate the assembly and transmission of map information 42 to WCD 20. The transmitted map information 42 is in a format that allows WCD 20 to present map information 42 to a user on user interface 34. For example, map information 42 includes layout 16 of physical location 18 corresponding to geographic position 22 of WCD 20. Additional layouts of additional physical locations may also be forwarded based on user interaction with computer system 12 through WCD 20.

An optional portion of the method includes transmitting item information to the wireless communications device (Block 156). In one embodiment, for example, a store may broadcast a list of all the merchandise, or some other categorization of the merchandise, available within the store. As such, in this example, computer system 12 generates and transmits item information 54, such as an item identification 56 or an item description 58 associated with each item 24 in a list of items available at physical location 18, along with or in association with layout 16 and any other physical location information 46. For example, such item information 54, in particular item identification 56 and/or item description 58, may be presented to the user of WCD 20 on an interactive user interface 34 that allows the user to select one or more desired items. Further, an alternate portion of the method may include receiving selected item identification from the wireless communications device (Block 158). In one embodiment, for example, a user of WCD 20 selects an item 24 associated with the received list of item identifications 56 and/or item descriptions 58, and transmits the selected item identification(s) 56 and/or item description(s) 58 to computer system 12. Alternatively, the user of WCD 20 may have a "shopping list" that they submit to computer system 12 in order to receive item information, such as the location and/or availability of each item. In this example, the user of WCD 20 may separately enter selected item identification(s) 56 and/or item description(s) 58 and transmit it to computer system 12. The user may enter the "shopping list," e.g. the item information, directly into WCD 20, or may enter the shopping list into any other computer device associated with system 10 that allows the shopping list to be downloaded to WCD 20 and/or transmitted to computer system 12. Additionally, in this alternate portion of the method, when receiving the selected item information (Block 158), the method steps of generating and transmitting map information (Blocks 152 and 154) further include generating and transmitting additional information related to the selected item information, such as item location 26, item price 60, item quantity 62, item substitute 64, associated items 66 and/or additional item information 68. For example, in the "shopping list" example, layout 16 may include multiple indicators representing multiple item locations. As such, a user of WCD 20 may be able to determine their own path through layout 16 to reach each item. For example, rather than picking the shortest route, a user may use "other factors" to determine the order of reaching each item. Such "other factors" may include saving heavy or bulky items for last, going to the location of items having low quantities first, going first to item locations having perceived long wait times (e.g. such as the fresh meat counter at a grocery store), etc. Additionally, once an item location is reached by the user of WCD 20, the representation of the item location on the layout may change, such as by changing color or changing symbols, to indicate that the location has already been visited. For example, computer system 12 may compare the current geographic position of WCD 20 and compare it to each item location, and thereby recognize when the user has reached a given item location. Then, computer system 12 may generate a change in representation of the respective item information that causes the presentation of that item location to change on WCD 20. As such, the user of WCD 20 may be able to differentiate visited item locations from non-visited item locations. This may be helpful for a user of WCD 20 to keep track of where they have been and where they need to go. Further, associated with this embodiment, the method may further include generating and transmitting route information to the wireless communications device (Blocks 160 and 162). In one embodiment, for example, routing module 70 and route generator 28, determine directions 30 from geographic position 22 of WCD 20 to one or more item locations 26 associated with the selected items 24 received from the user of WCD 20. Further, routing module 70 may also include other routing information 71, such as a travel time and/or travel distance, associated with directions 30. Map generator 14 may operate to combing routing information 71 with layout 16 for presentation to the user on user interface 34 of WCD 20 in order to assist the user in maneuvering through physical location 18. For example, a user of WCD 20 may wish to take the most efficient route through the store, such as during a busy time for shopping for merchandise, and thus may want the "shortest distance" route to locate all of their items of interest. On the other hand, a user of WCD 20 at a museum or park may only have a limited amount of time to see the items of interest, and may desire to incorporate the travel time into the route to determine what items can be reached within a given time.

In another alternative, besides locating items within a physical location, the described embodiments may provide a method of performing a transaction at the item location and/or within the physical location. For example, computer system 12 may create a virtual shopping cart associated with WCD 20 and physical location 18. When the user of WCD 20 reaches item location 26 and loads each item 24 into their actual shopping cart, the user may communicate with computer system 12 to indicate the item and quantity to load into the virtual shopping cart on system 10. For example, the user may transmit a purchase item identification and a purchase item quantity from WCD 20 to computer system 12, which loads the indicated items into the virtual shopping cart and computes the total cost. In this manner, the user of WCD 20 may be able to keep track of the items, and the associated cost of the items, within their actual shopping cart as they shop. As such, once the user of WCD 20 has gone through their "shopping list" and is ready to check out of physical location 18, computer system 12 already knows the items, quantities and total cost associated with a purchasing transaction. So, computer system 12 processes a purchase transaction for the items to be purchased based on the contents of the virtual shopping cart. For example, computer system 12, a self check-out station, or a check-out clerk prompts the user for a payment method, and the user may purchase the goods within their actual shopping cart by cash, charge, check, adding the total cost to an associated billing entity (such as adding to a phone bill, etc.). Thus, with this embodiment, there is no need to individually scan each item within the user's actual shopping cart as computer system 12 is advised of the items to be purchased as the user shops.

It should also be noted that, in some embodiments, geographic position 22 may be a future geographic position of WCD 20. For instance, a user of remotely-located computer system 38 may access computer system 12 via communications network 36 and identify a future geographic position of WCD, and also identify and/or select items of interest, in order to remotely initiate a download of map information 42 onto WCD 20. For instance, such a feature of system 10 may be desirable for preloading, or pre-arranging a desired downloading, of map and/or directions onto WCD prior to actually reaching the desired geographic position and/or physical location.

While the various disclosed embodiments have been illustrated and described, it will be clear that the subject matter of this document is not limited to these embodiments only. Numerous modifications, changes, variations, substitutions and equivalents will be apparent to those skilled in the art without departing from the spirit and scope of the disclosed embodiments as described in the claims.

What is claimed is:

1. A location-based method of communicating information, comprising:
   receiving a geographic position associated with a wireless communications device;
   determining a list of a plurality of items available at a physical location corresponding to the geographic position;
   transmitting to the wireless communications device the list of the plurality of items available at the physical location corresponding to the geographic position;
   receiving from the wireless communications device a selection of at least one of the plurality of items on the list;
   generating map information for receipt by the wireless communications device based at least in part on the received selection, the map information including physical location information including a layout of the physical location corresponding to the geographic position and an item location within the layout corresponding to the selected at least one item; and
   generating a change in representation associated with the selected at least one item in response to recognizing that the wireless communications device reached the item location corresponding to the selected at least one item, wherein the generated change in representation causes a presentation of the item location within the layout to change on the wireless communications device to indicate that the item location has been visited.

2. The method of claim 1, further comprising generating item-related information for receipt by the wireless communications device, where the item-related information includes at least one of an item quantity, an item price, an item description, an item substitute, an associated item, or additional item information corresponding to the item.

3. The method of claim 1, further comprising receiving at least some portion of item information for each one of a plurality of selected items, and generating for receipt by the wireless communications device a plurality of item locations each corresponding to one of the plurality of selected items.

4. The method of claim 3, further comprising generating route information for receipt by the wireless communications device, the route information comprising directions through the physical location to each of the plurality of item locations.

5. The method of claim 4, further comprising identifying a shortest distance through the physical location between each one of the plurality of item locations, where the route information includes the shortest distances.

6. The method of claim 4, further comprising identifying a predicted travel time through the physical location to the plurality of item locations, where the directions include the predicted travel time.

7. The method of claim 1, further comprising generating additional physical location information including at least one of a physical location identification, a physical location description or location-specific information.

8. The method of claim 7, further comprising transmitting the additional physical location information for receipt by the wireless communications device.

9. An apparatus for communicating a location of an item, comprising:
- means for receiving a geographic position of a wireless communications device;
- means for determining a list of a plurality of items available at a physical location corresponding to the geographic position;
- means for transmitting to the wireless communications device the list of the plurality of items available at the physical location corresponding to the geographic position;
- means for receiving from the wireless communications device a selection of at least one of the plurality of items on the list;
- means for generating map information based at least in part on the received selection, wherein the generated map information includes a layout of the physical location corresponding to the geographic position of the wireless communications device and directions from the geographic position to an item location within the physical location corresponding to the selected at least one item;
- means for transmitting the map information to the wireless communications device; and
- means for generating a change in representation associated with the selected at least one item in response to recognizing that the wireless communications device reached the item location corresponding to the selected at least one item, wherein the generated change in representation causes a presentation of the item location within the layout to change on the wireless communications device to indicate that the item location has been visited.

10. The apparatus of claim 9, further comprising means for generating item-related information for receipt by the wireless communications device, where the item-related information includes at least one of an item quantity, an item price, an item description, an item substitute, an associated item, or additional item information corresponding to the item.

11. The apparatus of claim 9, further comprising means for generating physical location information including at least one of a physical location identification, a physical location description or location-specific information.

12. An apparatus for wirelessly communicating location-based information, comprising:
- a transceiver for receiving a geographic position associated with a wireless communications device, transmitting to the wireless communications device a list of a plurality of items available at a physical location corresponding to the geographic position, and receiving from the wireless communications device a selection of at least one of the plurality of items on the list;
- a processor for determining the list of the plurality of items available at the physical location corresponding to the geographic position prior to transmitting the list to the wireless communications device; and
- a map generator for generating map information for receipt by the wireless communications device based at least in part on the received selection, the map information including physical location information having a layout of the physical location corresponding to the geographic position associated with the wireless communications device and an item location within the layout corresponding to the selected at least one item, the map generator further for generating a change in representation associated with the selected at least one item in response to recognizing that the wireless communications device reached the item location corresponding to the selected at least one item, wherein the generated change in representation causes a presentation of the item location within the layout to change on the wireless communications device to indicate that the item location has been visited.

13. The apparatus of claim 12, wherein the map generator is further operable to generate item-related information for receipt by the wireless communications device, where the item-related information includes at least one of an item quantity, an item price, an item description, an item substitute, an associated item, or additional item information corresponding to the item.

14. The apparatus of claim 12, wherein the map generator is further operable to receive at least some portion of item information for each one of a plurality of selected items, and to generate for receipt by the wireless communications device a plurality of item locations each corresponding to one of the plurality of selected items.

15. The apparatus of claim 14, further comprising a route generator operable to generate route information for receipt by the wireless communications device, the route information comprising directions through the physical location to each of the plurality of item locations.

16. The apparatus of claim 15, wherein the route generator is further operable to identify a shortest distance through the physical location between each one of the plurality of item locations, where the route information includes the shortest distances.

17. The apparatus of claim 15, wherein the route generator is further operable to determine a predicted travel time through the physical location to the plurality of item locations, where the directions include the predicted travel time.

18. The apparatus of claim 12, wherein the map generator is further operable to generate additional physical location information including at least one of a physical location identification, a physical location description or location-specific information.

19. The apparatus of claim 18, wherein the map generator is further operable to transmit the additional physical location information for receipt by the wireless communications device.

20. A wireless communications device, comprising:
- a processor;
- a display coupled to the processor and operable to display a user interface responsive to the processor; and
- a memory coupled to the processor and having instructions which, when executed by the processor, cause the processor to:
  - transmit a geographic position associated with the wireless communications device;
  - receive a list of a plurality of items determined to be available at a physical location corresponding to the geographic position;
  - transmit a selection of at least one of the plurality of items on the list;
  - receive map information based at least in part on the transmitted selection, wherein the received map information includes a layout of the physical location corresponding to the geographic position and an item location within the layout corresponding to the selected at least one item;
  - present the user interface on the display, wherein the user interface includes the map information; and
  - receive a change in representation associated with the selected at least one item in response to the wireless communications device reaching the item location corresponding to the selected at least one item, wherein the received change in representation causes a presentation of the item location within the layout to change on the wireless communications device to indicate that the item location has been visited.

21. The wireless communications device of claim 20, wherein the user interface further includes directions through the layout to the item location.

22. The wireless communications device of claim 21, wherein the directions further include a distance from the geographic position to the item location.

23. The wireless communications device of claim 21, wherein the directions further include a predicted travel time from the geographic position to the item location.

24. The wireless communications device of claim 20, wherein the user interface further includes at least one of a physical location identification, a physical location description or location-specific information.

25. The wireless communications device of claim 20, wherein the user interface further includes at least one of an item quantity, an item price, an item description, an item substitute, an associated item, or additional item information corresponding to the item.

26. A method of presenting location-based information on a wireless communications device, comprising:
    transmitting a geographic position associated with the wireless communications device;
    receiving at the wireless communications device a list of a plurality of items determined to be available at a physical location corresponding to the geographic position;
    transmitting from the wireless communications device a selection of at least one of the plurality of items on the list;
    receiving map information based at least in part on the transmitted selection, wherein the received map information includes a layout of the physical location corresponding to the geographic position and an item location within the layout corresponding to the selected at least one item;
    presenting a user interface on a display of the wireless communications device, where the user interface includes the map information; and
    receiving a change in representation associated with the selected at least one item in response to the wireless communications device reaching the item location corresponding to the selected at least one item, wherein the received change in representation causes a presentation of the item location within the layout to change on the wireless communications device to indicate that the item location has been visited.

27. An apparatus for presenting location-based information, comprising:
    means for transmitting a geographic position associated with a wireless communications device;
    means for receiving at the wireless communications device a list of a plurality of items determined to be available at a physical location corresponding to the geographic position;
    means for transmitting from the wireless communications device a selection of at least one of the plurality of items on the list;
    means for receiving map information based at least in part on the transmitted selection, wherein the received map information includes a layout of the physical location corresponding to the geographic position and an item location within the layout corresponding to the selected at least one item;
    means for presenting a user interface on a display of the wireless communications device, wherein the user interface includes the map information; and
    means for receiving a change in representation associated with the selected at least one item in response to the wireless communications device reaching the item location corresponding to the selected at least one item, wherein the received change in representation causes a presentation of the item location within the layout to change on the wireless communications device to indicate that the item location has been visited.

28. A non-transitory computer-readable medium for communicating location-based information, wherein the non-transitory computer-readable medium is a physical medium and comprises:
    at least one sequence of instructions, wherein execution of the instructions by a processor causes the processor to:
        receive a geographic position associated with a wireless communications device;
        determine a list of a plurality of items available at a physical location corresponding to the geographic position;
        transmit to the wireless communications device the list of the plurality of items available at the physical location corresponding to the geographic position;
        receive from the wireless communications device a selection of at least one of the plurality of items on the list;
        generate map information for receipt by the wireless communications device based at least in part on the received selection, the map information including physical location information including a layout of the physical location corresponding to the geographic position and an item location within the layout corresponding to the selected at least one item; and
        generate a change in representation associated with the selected at least one item in response to recognizing that the wireless communications device reached the item location corresponding to the selected at least one item, wherein the generated change in representation causes a presentation of the item location within the layout to change on the wireless communications device to indicate that the item location has been visited.

29. A non-transitory computer-readable medium for presenting location-based information, wherein the non-transitory computer-readable medium is a physical medium and comprises:
    at least one sequence of instructions, wherein execution of the instructions by a processor causes the processor to:
        transmit a geographic position associated with a wireless communications device;
        receive a list of a plurality of items determined to be available at a physical location corresponding to the geographic position;
        transmit a selection of at least one of the plurality of items on the list;
        receive map information based at least in part on the transmitted selection, wherein the received map information includes a layout of the physical location corresponding to the geographic position and an item location within the layout corresponding to the selected at least one item;
        present a user interface on a display of the wireless communications device, where the user interface includes the map information; and receive a change in representation associated with the selected at least one item in response to the wireless communications device reaching the item location corresponding to the selected at least one item, wherein the received change in representation causes a presentation of the item location within the layout to change on the wireless communications device to indicate that the item location has been visited.

30. The method of claim 1, further comprising transmitting the map information to the wireless communications device through a cellular network remote from the geographic position.

31. The method of claim 30, wherein generating the map information is performed at a remote location away from the geographic position.

32. The method of claim 1, wherein each item of the list transmitted to the wireless communications device is available for purchase at a store at the physical location corresponding to the geographic position.

33. The method of claim 32, further comprising:
receiving one or more purchase item identifications from the wireless communications device, wherein the one or more purchase item identifications indicate that one or more items in the transmitted list that are available for purchase at the store have been placed in an actual shopping cart;
loading the one or more items in the transmitted list that correspond to the one or more purchase item identifications into a virtual shopping cart; and
processing a transaction for the one or more items placed in the actual shopping cart based on contents of the virtual shopping cart at a check-out station in the store.

34. The method of claim 1, wherein the geographic position associated with the wireless communications device comprises a future geographic position that the wireless communications device identifies to initiate downloading the map information prior to reaching the physical location corresponding to the future geographic position.

* * * * *